United States Patent
Bluff et al.

(10) Patent No.: US 7,775,535 B2
(45) Date of Patent: Aug. 17, 2010

(54) SUSPENSION SUBASSEMBLY

(75) Inventors: Christopher Bluff, Cheshire (GB); David Chen, Flintshire (GB); Paul Bell, Wrexham (GB); Shajimon Kaithan, Bangalore (IN); Shaun Gillespie, Wrexham (GB); Andrew Mathie, Wrexham (GB); Martin Peaker, Cheshire (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 191 days.

(21) Appl. No.: 11/869,149

(22) Filed: Oct. 9, 2007

(65) Prior Publication Data

US 2008/0084047 A1    Apr. 10, 2008

(30) Foreign Application Priority Data

Oct. 10, 2006    (GB)    ................... 0619981.4

(51) Int. Cl.
*B60G 9/00*    (2006.01)
(52) U.S. Cl. .................. 280/124.116; 280/124.128
(58) Field of Classification Search .......... 280/124.116, 280/124.128
See application file for complete search history.

(56) References Cited

U.S. PATENT DOCUMENTS

| | | | |
|---|---|---|---|
| 3,694,001 A | 9/1972 | McGee | |
| 3,966,223 A | 6/1976 | Carr | |
| 4,166,639 A | 9/1979 | Taylor | |
| 4,756,550 A * | 7/1988 | Raidel | ............ 280/86.75 |
| 4,881,747 A * | 11/1989 | Raidel | ............ 280/81.6 |
| 5,015,004 A | 5/1991 | Mitchell | |
| 5,018,756 A * | 5/1991 | Mitchell | ............ 280/81.6 |
| 5,171,036 A * | 12/1992 | Ross | ............ 280/124.116 |
| 5,346,247 A * | 9/1994 | Snyder | ............ 280/124.116 |
| 5,362,095 A | 11/1994 | Eveley | |
| 5,924,712 A * | 7/1999 | Pierce | ............ 280/124.13 |
| 6,073,946 A * | 6/2000 | Richardson | ............ 280/86.5 |
| 6,340,165 B1 | 1/2002 | Kelderman | |
| 6,471,223 B1 | 10/2002 | Richardson | |
| 6,508,482 B2 * | 1/2003 | Pierce et al. | ............ 280/124.116 |
| 7,296,809 B2 * | 11/2007 | Zebolsky | ............ 280/86.75 |
| 7,445,220 B2 * | 11/2008 | von Mayenburg et al. | ............ 280/124.116 |
| 2001/0020775 A1 * | 9/2001 | Pierce et al. | ............ 280/124.128 |
| 2003/0038471 A1 | 2/2003 | Svartz et al. | |
| 2005/0082814 A1 | 4/2005 | Ramsey | |
| 2005/0161896 A1 | 7/2005 | Reineck | |

(Continued)

FOREIGN PATENT DOCUMENTS

DE    19818698    6/1999

(Continued)

OTHER PUBLICATIONS

European Search Report mailed Dec. 4, 2007.

(Continued)

*Primary Examiner*—Toan C To
(74) *Attorney, Agent, or Firm*—Carlson, Gaskey & Olds (57) ABSTRACT

A suspension subassembly for securement to a heavy vehicle trailer includes a hanger bracket for a trailing arm, an air spring mounting bracket, a damper mounting bracket, and a connection member extending longitudinally between the hanger bracket and the damper mounting bracket. The damper mounting bracket is positioned intermediate the hanger bracket and the air spring mounting bracket.

24 Claims, 6 Drawing Sheets

U.S. PATENT DOCUMENTS

2006/0249923 A1* 11/2006 Ramsey ............... 280/124.131

FOREIGN PATENT DOCUMENTS

| EP | 1086836 | 3/2001 |
|----|---------|--------|
| GB | 2262722 | 6/1993 |
| GB | 2351050 | 12/2000 |
| GB | 2367111 | 3/2002 |
| WO | 01/96171 | 12/2001 |
| WO | 2004/054825 | 7/2004 |

OTHER PUBLICATIONS

United Kingdom Search Report dated Dec. 11, 2006.
European Examination Report dated Nov. 12, 2009.

* cited by examiner

SUSPENSION SUBASSEMBLY

REFERENCE TO RELATED APPLICATIONS

This application claims priority to United Kingdom Patent Application No. GB 0619981.4 filed on Oct. 10, 2006.

BACKGROUND OF THE INVENTION

The present invention relates to a suspension subassembly for securement to a heavy vehicle trailer.

Heavy commercial vehicles typically employ trailing arm suspension systems, particularly in relation to axles of trailers of articulated vehicles or, potentially, rear axles of rigid body vehicles.

Heavy commercial vehicles (including trucks, buses and coaches) can be distinguished from light commercial vehicles (such as vans) and light passenger vehicles due to one or more of the following characteristics:

1. A laden weight in excess of approximately 3.5 tonnes.
2. The use of air actuated brakes as opposed to hydraulically actuated brakes (because air actuated brakes are better able to withstand the increased heat generated by the repeated braking of a vehicle having a weight in excess of approximately 3.5 tonnes).

Such vehicles (including trailers) also typically employ a pair of spaced parallel beams or rails that run a length of the vehicle and act as a front of a chassis upon which a vehicle body is mounted.

When used in heavy commercial vehicles, the trailing arms are typically pivotally mounted to chassis beams of the vehicle via a "hanger bracket" welded to the chassis beam and extending downwardly therefrom. The trailing arm extends rearwardly (i.e., towards a rear of the vehicle) to a mounting position for an axle and then further rearwardly to a mounting surface for an air spring. The air spring itself is mounted between the trailing arm and the chassis beam via an air spring pedestal.

Axles in such vehicles are typically substantially rigid beam-type axles (i.e., axles that extend between spindles upon which wheels at opposite sides of the vehicle are mounted). In some circumstances, the orientation of the trailing arms may be reversed to pivot at a rear of the trailing arm, in which case they are known as "leading arms." For the purposes of this specification, the term trailing arm should also be understood to encompass leading arms.

Typically, the suspension manufacturer will supply a complete set of components to a trailer manufacturer including two trailing arms, an axle beam, two hanger brackets, two air springs, two dampers and two air spring pedestals for each axle installation. In some circumstances, the trailing arms may be secured to the axle before being supplied to the trailer manufacturer. In any event, the trailer manufacturer is required to assemble a number of components together. The assembly needs to be accurately completed to ensure that the wheels are accurately aligned to the trailer. This prevents undue stress from being placed on a suspension, the trailer and the wheel components.

It is known to use slider systems in which an entire running gear of the trailer is secured to a frame that may be released using retractable pins and slid along the chassis to rapidly vary a wheelbase to adjust load distribution and maneuverability characteristics of the trailer. In such systems, cross-members connect the hanger brackets on each side of the trailer, and the slider system and the frame is a complex multi-component assembly. An example of such a system can be seen in US 2005/0082814 (Ramsey).

The present invention seeks to overcome or at least mitigate the problems of the prior art.

SUMMARY OF THE INVENTION

Accordingly, one aspect of the present invention provides a suspension subassembly for securement to a heavy vehicle trailer. The suspension subassembly includes a hanger bracket for attachment of a trailing arm, an air spring mounting bracket, a damper mounting bracket, and a connection member extending longitudinally between the hanger bracket and the air spring mounting bracket, and connecting the hanger bracket and air spring mounting bracket. The damper mounting bracket is positioned intermediate the hanger bracket and the air spring mounting bracket.

A second aspect of the present invention provides a suspension assembly including a suspension subassembly according to the preceding paragraph, a suspension trailing arm, an air spring and a damper.

A third aspect of the present invention provides a suspension arrangement including first and second suspension subassemblies according to the first example, wherein the suspension subassemblies are secured together in a laterally spaced relationship.

A fourth aspect of the present invention provides a method of fitting a subassembly, according to the first example, to a chassis rail of a heavy vehicle trailer and includes the step of permanently or semi-permanently securing the suspension subassembly to the chassis rail.

BRIEF DESCRIPTION OF THE DRAWINGS

Embodiments of the present invention are now described, by way of example only, with reference to the accompanying drawings in which.

DETAILED DESCRIPTION OF THE PREFERRED EMBODIMENT

Figure 1:
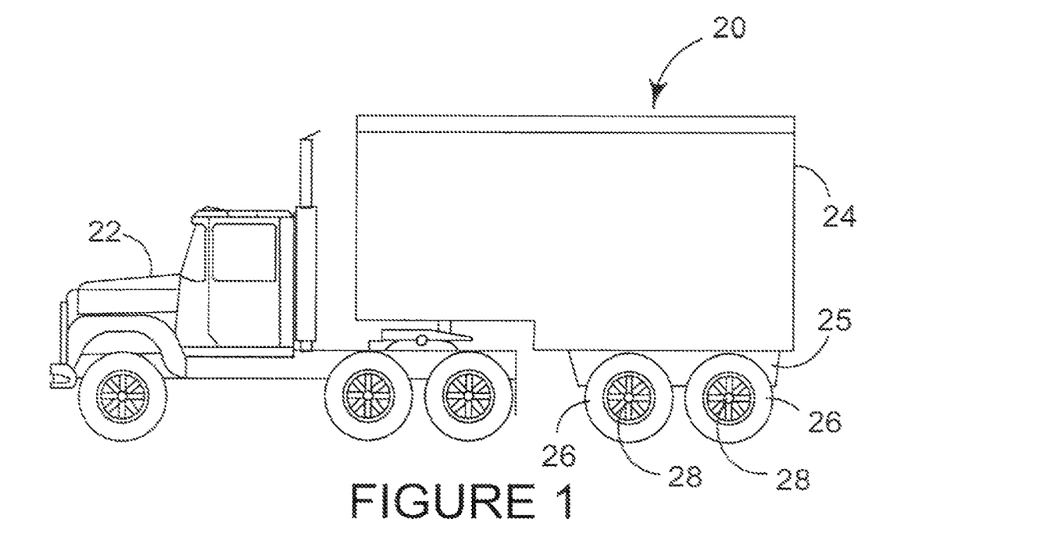
FIG. 1 is a side view of a typical heavy commercial vehicle.

FIG. 1 shows a heavy commercial vehicle 20 including a tractor portion 22 and a trailer portion 24 mounted for articulation relative to the tractor portion 22. A plurality of wheels 26 are suspended from a trailer chassis 25 of the trailer portion 24 so that the plurality of wheels 26 rotate about axes 28.

Figure 2:
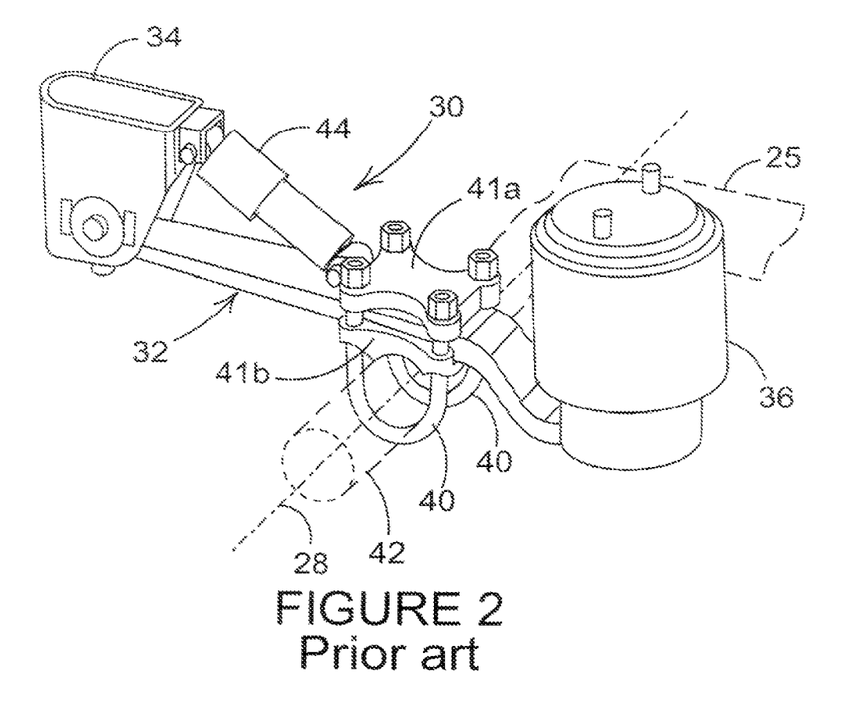
FIG. 2 is a perspective view of a prior art suspension assembly.

FIG. 2 illustrates a prior art suspension assembly 30 including a trailing arm 32 (such as a spring steel suspension arm), a hanger bracket 34 (such as a trailing arm hanger bracket) and an air spring 36. The hanger bracket 34 and the air spring 36 provide a connection with, and suspension relative to, the trailer chassis 25 (shown in broken lines for clarity) in a known manner. U-bolts 40, a top plate 41a and a bottom plate 41b mount an axle 42 (shown in broken lines for clarity) to the trailing arm 32. In particular, it should be noted that the bottom plate 41b is welded directly to the axle 42. Wheels (not shown) are secured to each end of the axle 42 for rotation about the axis 28. A damper 44, mounted between the hanger bracket 34 and the assembly of the U-bolt 40 and the top plate 41a and the bottom plate 41b, is provided to damp oscillations of the axle 42 relative to the trailer chassis 25 as the heavy commercial vehicle 20 drives over uneven ground.

It will be appreciated that a considerable amount of assembly is required, and a large number of components are needed, to provide a complete suspension assembly of this type. Furthermore, the hanger bracket 34 and the air spring 36 must be accurately secured to the trailer chassis 25 to ensure the plurality of wheels 26 are correctly aligned with respect to the trailer portion 24. Incorrect alignment may lead to excessive tire wear, increased fuel consumption and premature failure of suspension components.

Figure 3:
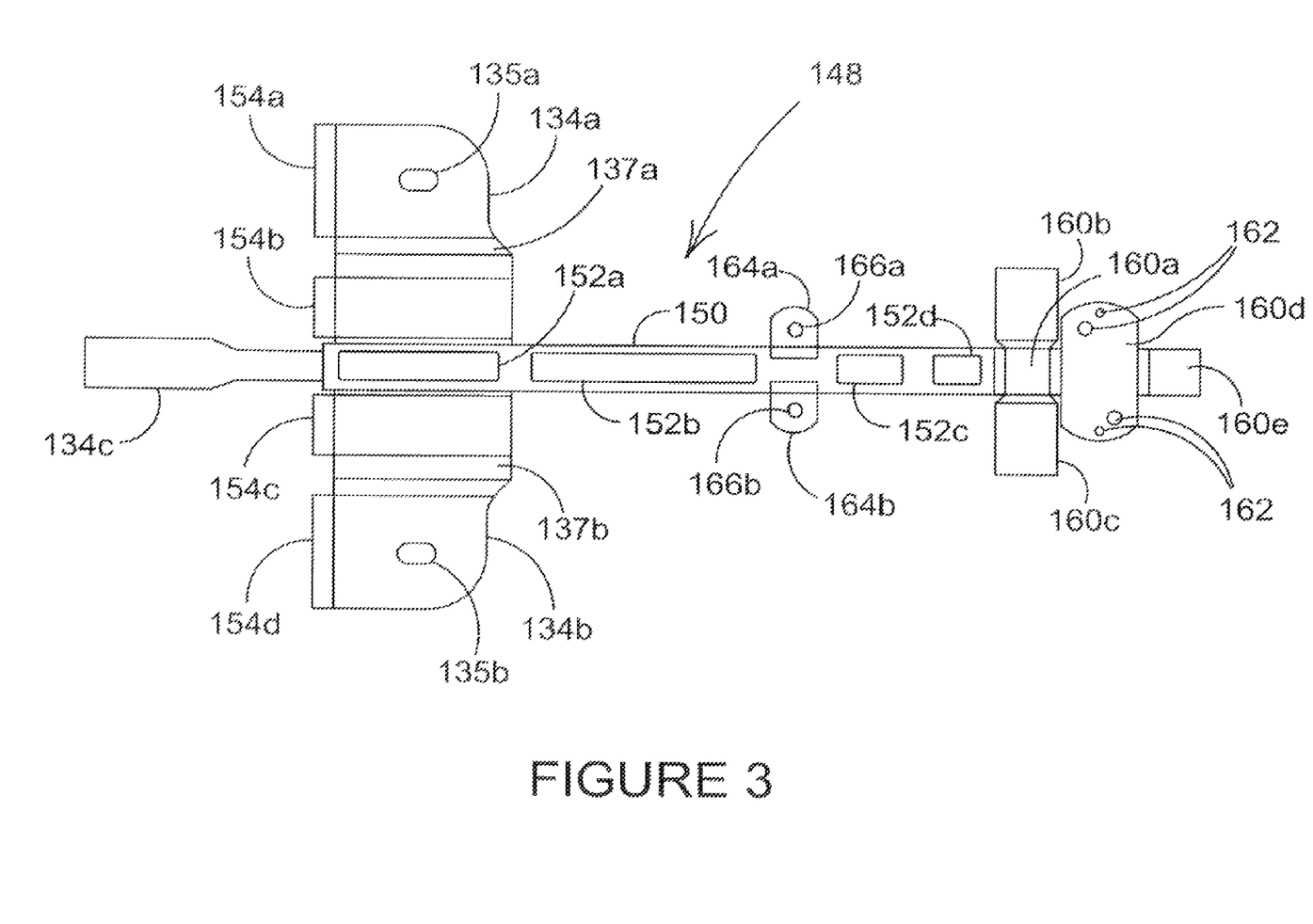
FIG. 3 is a plan view of a stamping from which a suspension subassembly of the present invention is formed.

Referring now to FIG. 3, subassembly 148 (such as a stamping subassembly) for forming a suspension subassembly according to one embodiment of the present invention is illustrated. The subassembly 148 is formed from a suitable gauge of sheet steel and includes an elongate connection member 150 provided with a plurality of apertures 152a, 152b, 152c and 152d. At a first fore or front end of the elongate connection member 150, first and second hanger bracket side flanges 134a and 134b extend from the sides of the elongate connection member 150 in opposing directions and have tab portions 154a, 154b, 154c and 154d projecting from the fore end (left-hand end in FIG. 3). Slotted apertures 135a and 135b are formed in each hanger bracket side flange 134a and 134b for bolting a trailing arm to the hanger bracket 134, as discussed in more detail below. An end flange 134c extends forward from a fore end edge of the elongate connection member 150 and completes the sections of the stamping that form the hanger bracket 34 of the trailing arm 32.

At the opposite, aft or rear end of the elongate connection member 150, a plurality of panels are provided that form an air spring mounting bracket in the form of a downwardly facing air spring pedestal 160 (see FIGS. 4 to 7). The panels include an end panel 160a attached to an aft end edge of the elongate connection member 150, opposing side panels 160b and 160c attached to side edges of the end panel 160a, a mounting panel 160d attached to the aft end edge of the end panel 160a, and a front panel 160e attached to the aft end edge of the mounting panel 160d. Mounting holes 162 are provided in the mounting panel 160d through which threaded portions on an upper face of an air spring are located when the assembly is assembled in order to attach the air spring to the subassembly 148.

First and second damper mounting flanges 164a and 164b that project from the side edges of the elongate connection member 150 are provided intermediate the hanger side bracket flanges 134a and 134b and the air spring pedestal panels 160a to 160e and, when the subassembly 148 is formed, are bent to project downwardly in a spaced parallel arrangement. Through-holes 166a and 166b are provided in each bracket panel through which a bolt or other suitable fixing may be inserted to pivotably mount a damper 144 (FIG. 7) between the damper mounting flanges 164a and 164b.

The subassembly 148 is assembled from the stamping shown in FIG. 3 by a standard forming operation in which the hanger bracket side flanges 134a and 134b are bent downwardly. The hanger bracket side flanges 134a and 134b have a flared portion 137a and 137b formed therein such that lower portions of the hanger bracket side flanges 134a and 134b remain in a parallel relationship, but are mutually spaced by a greater amount than the portion nearest the elongate connection member 150 in order to accommodate a width of the trailing arm 132. The tab portions 154a to 154d are bent inwardly, and the end flange 134c is bent downwardly to meet the tab portion 154a and 154b and is secured thereto to form the support bracket as shown in FIGS. 4 to 7 by welding or other suitable methods.

Similarly, the end panel 160a, the mounting panel 160d and the front panel 160e are bent around to be arranged at approximately 90 degrees to each other, with an end edge of the front panel 160e resting against an underside of the elongate connection member 150. The side panels 160b and 160c are then bent in the fore direction such that they rest against side edges of elongate connection member 150. Again, the various panels are welded to each other to provide the downwardly facing air spring pedestal 160 as shown in FIGS. 4 to 7.

Figure 4:
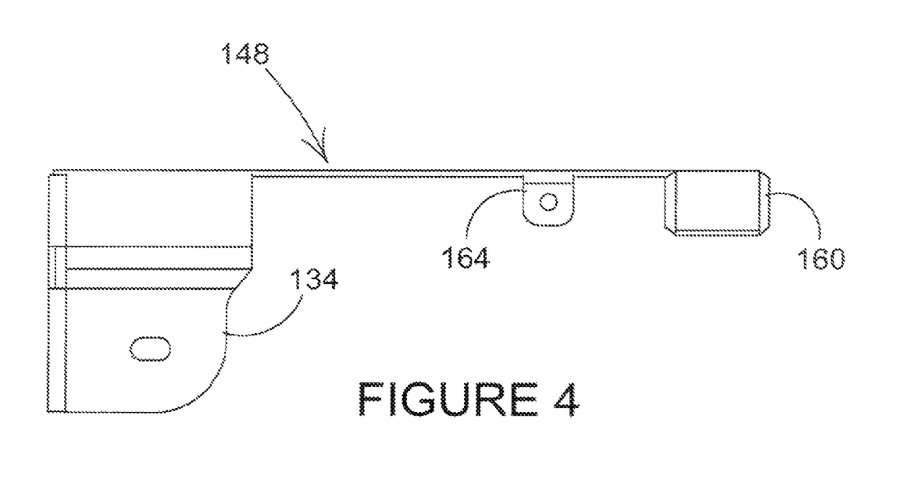
FIG. 4 is a side view of the suspension subassembly.
Figure 5:
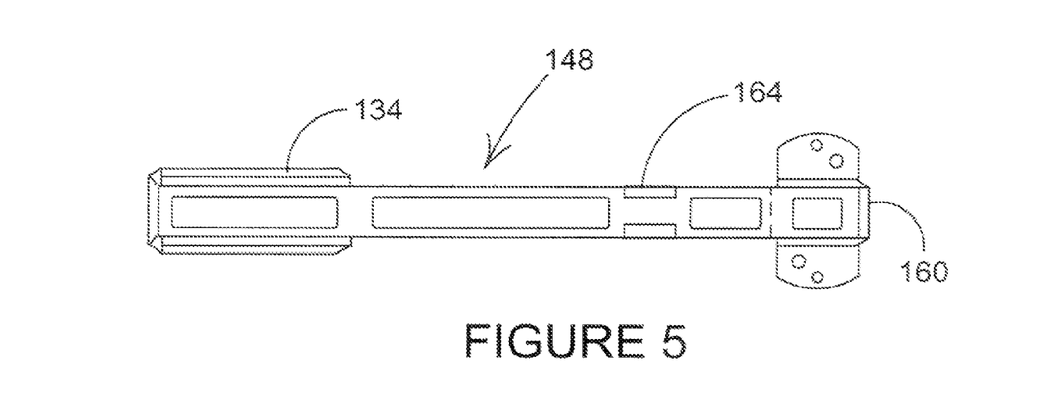
FIG. 5 is a plan view of the suspension subassembly of FIG. 4.
Figure 6:
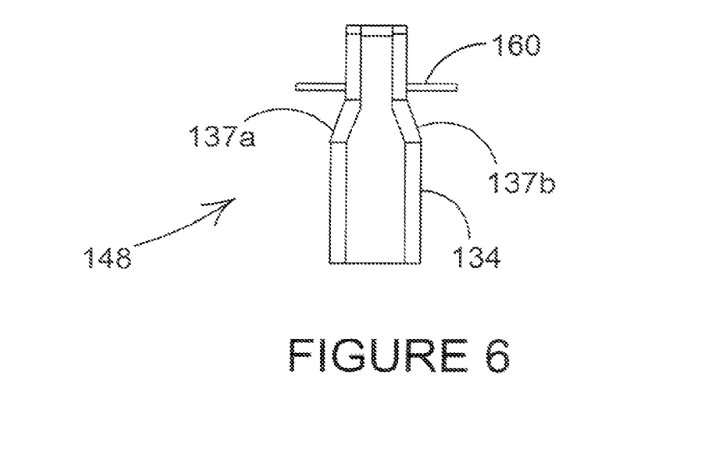
FIG. 6 is an end view of the suspension subassembly of FIG. 4.
Figure 7:
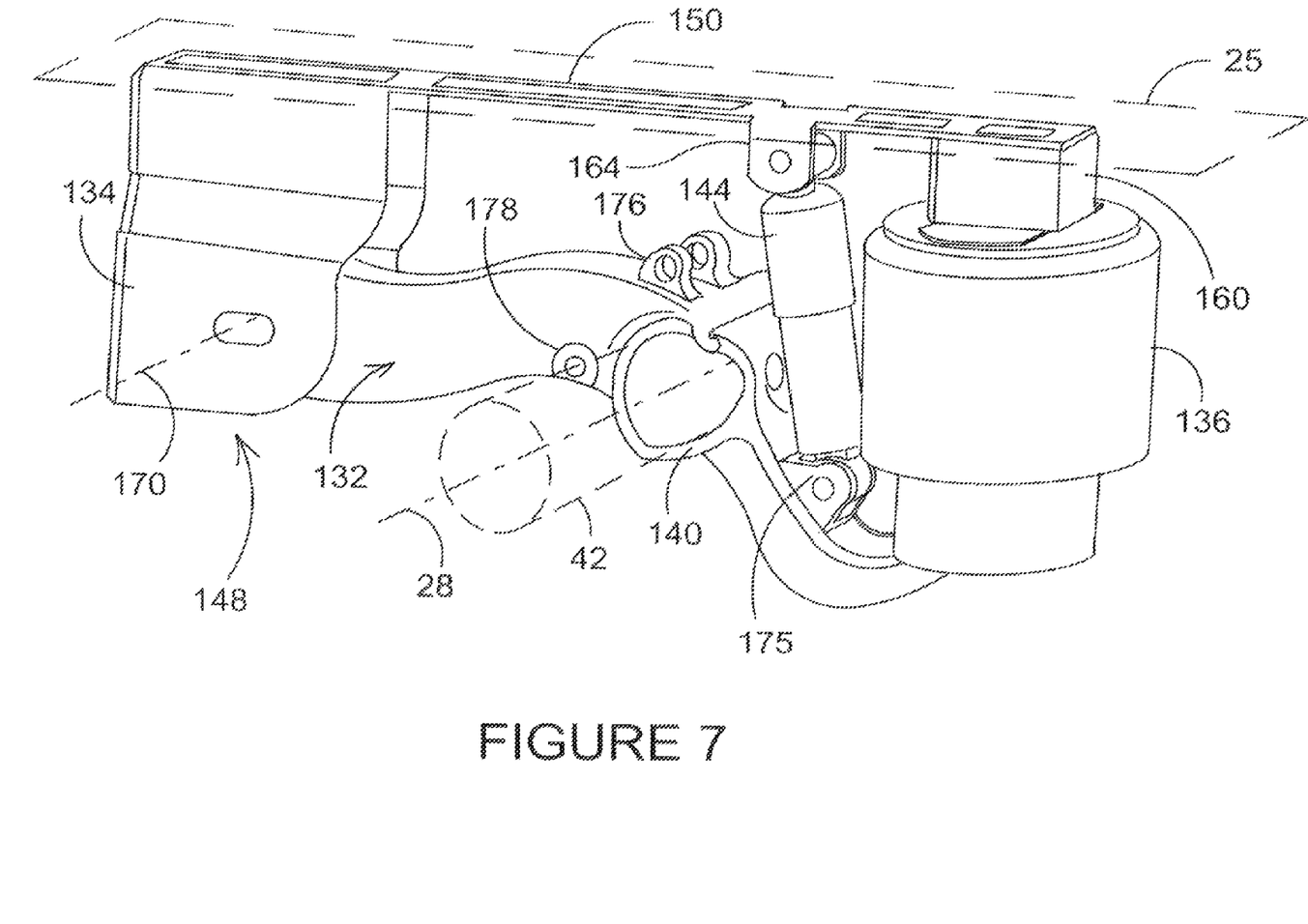
FIG. 7 is a perspective view of the suspension subassembly installed on a vehicle.

The damper mounting flanges 164a and 164b are bent downwardly through 90 degrees to form a damper mounting bracket 164 as shown in FIGS. 4, 5 and 7. The subassembly 148 is now ready for the attachment of the various further components that make up a suspension assembly.

Specifically, a trailing arm 132 (FIG. 7) is secured to the hanger bracket 134 using a suitable compliant bushing (e.g., of the type disclosed in the applicant's granted patent GB 2367111B, specifically incorporated herein by reference) and bolted connection through the slotted apertures 135a and 135b along an axis 170 in a similar manner to conventional attachments to support brackets (e.g., as illustrated in FIG. 2). In this embodiment, a cast trailing arm similar to the type disclosed in the applicant's published application WO2004/054825 is used, but in other embodiments of the present invention, other types of trailing arms may be employed.

The air spring 136 is bolted at its lower edge to an upwardly facing surface at a trailing end of the trailing arm 132 and is bolted at an upper end to the mounting panel 160d of the downwardly facing air spring pedestal 160 via the mounting holes 162.

The damper 144 is bolted at an upper end between the damper mounting flanges 164a and 164b of the damper mounting bracket 164, and at an lower end to a further mount 175 provided on the trailing arm 132 between an axle receiving location 140 and the air spring 136. As a result, it will be appreciated by those skilled in the art that the damper 144 is mounted closer to the vertical than the prior art damper 44 illustrated in FIG. 2. This may result in improved damper performance because the damper 144 is able to operate over a longer stroke for a given movement of the trailing arm 132. In addition, the damper 144 is in-line with the trailing arm 132, which improves the overall packaging of the suspension.

Alternate damper mounts 176 and 178 are also provided on the trailing arm 132. A damper mount 176 is provided on an upper face of the trailing arm 132 immediately in front of the axle receiving location 140 and may be used in conjunction with the damper mounting bracket 164 for a higher ride height "top mount" applications in which the trailing arm 132 is positioned at a greater angle with respect to the elongate connecting member 150. A third damper mount 178 on the trailing arm 132 is provided for use with a damper that is offset from a longitudinal axis of the trailing arm 132. It would therefore require the damper mounting bracket 164 of the subassembly 148 to also be offset from the longitudinal axis of the subassembly 148. While a universal trailing arm 132 may be provided with all three damper mounting locations 164, 176 and 178 as shown in FIG. 7, in alternative embodiments, differing trailing arms 132 may be produced for each separate application or differing rear sections of the trailing arm 132 (aft of the axle receiving location 140) may be provided.

Figure 8:
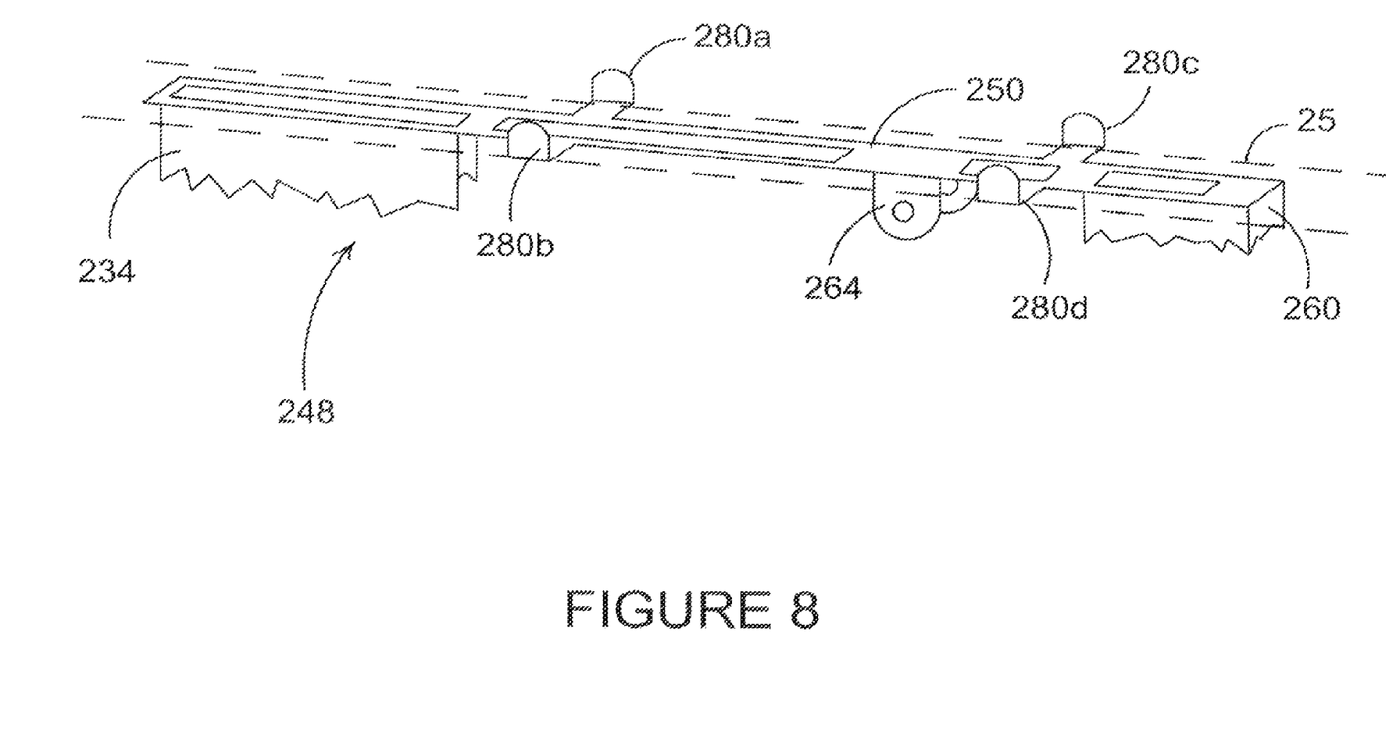
FIG. 8 is a perspective view of part of a suspension subassembly according to a second embodiment of the present invention.

FIG. 8 shows part of a subassembly 248 according to a second embodiment of the invention in which like parts have been labelled by like numerals labelled 100 greater. The subassembly 248 of the second embodiment is similar to the first embodiment, except that locating ears 280a, 280b, 280c and 280d project laterally outwardly and upwardly from each side of the connection member 250. The lateral spacing between the locating ears 280a, 280b, 280c and 280d is dimensioned to be substantially the same as a width of a trailer chassis 25 onto which the subassembly 248 is to be secured, thereby ensuring that the subassembly 248 may be accurately fitted to the trailer portion 24 in the direction transverse the trailer chassis 25.

The suspension assembly may be supplied to a trailer manufacturer with the parts assembled as set out above so that the trailer manufacturer may secure an axle 42 to the trailing arm 132 at the axle receiving location 140. The trailer manufacturer also secures the assembly to the trailer chassis 25 by welding the connecting portion to the trailer chassis 25 along its peripheral edges and/or along the edges of the apertures 152a, 152b and 152c of the connection member 250. This forms a permanent connection (i.e., a connection that would require the physical destruction thereof to separate the two components) between the subassembly 148 and the trailer chassis 25, in distinction to suspension slider systems in which trailer running gear is slideable with respect to the trailer chassis 25.

In alternative embodiments of the present invention, the subassembly 248 may be semi-permanently connected to the trailer chassis 25, e.g., by bolting (and may be provided with appropriately dimensioned bolt holes for this purpose). It will be appreciated that although not necessarily permanent, the subassembly 248 is intended to remain fixed at a particular location for the life of the trailer subject to maintenance requirements.

Figure 9A:
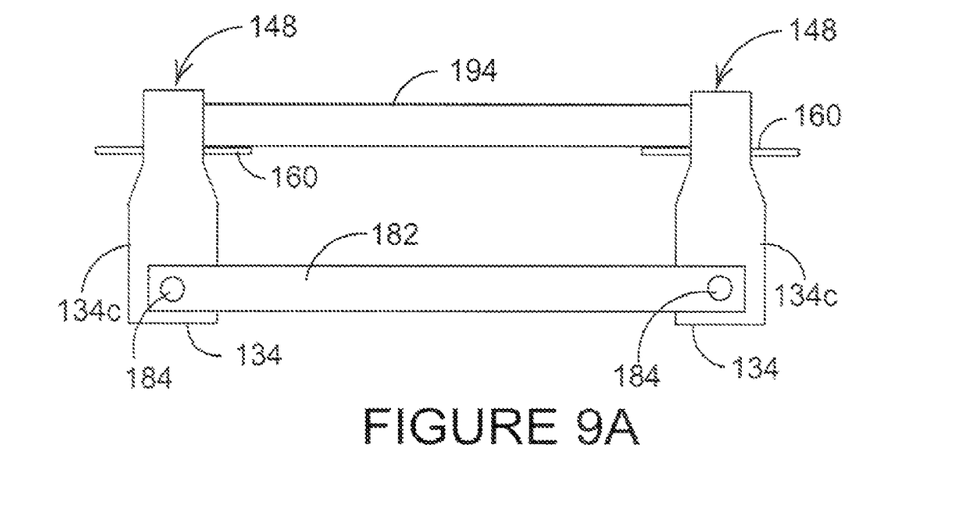
FIGS. 9A and 9B are end views of suspension arrangements according to third and fourth embodiments of the present invention.
Figure 9B:
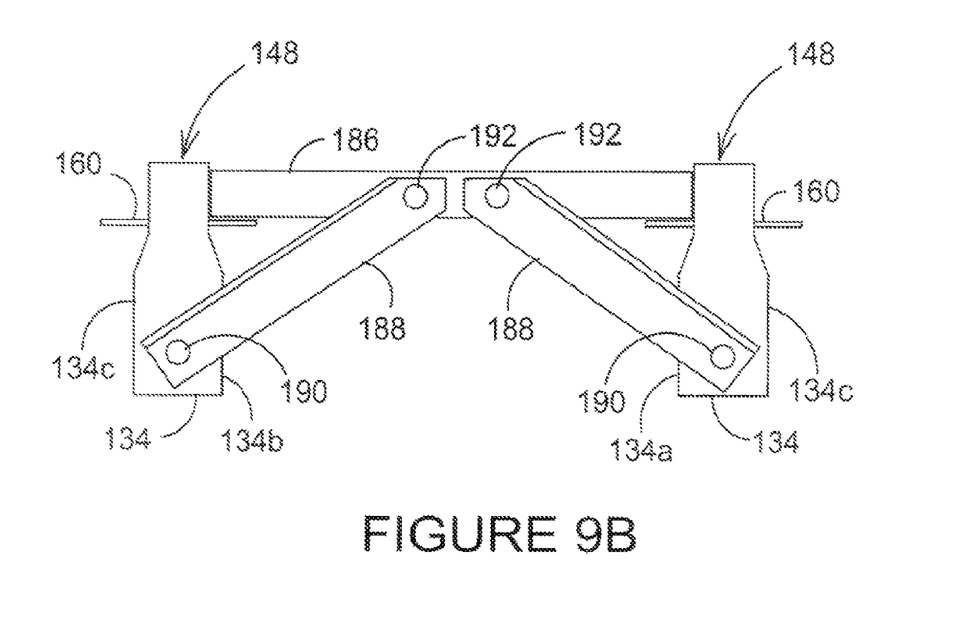

With reference to FIGS. 9A and 9B, the subassembly 148 is secured to a second subassembly 148 by using one or more cross members to form a suspension arrangement. The entire arrangement (with or without axles and/or other ancillary components) can then be shipped to a trailer manufacturer for fitment to the trailer chassis rails of a trailer portion 24 together. In FIG. 9A, a single C-section beam 182 extends horizontally from the end flange 134c of one hanger bracket 134 to the corresponding location on the hanger bracket 134 of the second subassembly 148. The single C-section beam 182 is welded to the hanger brackets 134 around an edge of circular apertures 184. In addition, a further cross member 194 extends between the air spring pedestals 160 of the subassemblies 148 by welding to the side panel 160b of one subassembly 148 and the side panel 160c of the other subassembly 148. A cross member 194 may be constructed from box-section, C-section or any other suitable profile.

In FIG. 9B, a box section cross member 186 extends between an upper part of the hanger bracket side flange 134a of one hanger bracket 134 and an upper part of the hanger bracket side flange 134b of another bracket 134 and is welded to each. First and second angle section bracing members extend from a lower part of the end flanges 134c up towards the middle of the box section cross member 186. The bracing members are welded to the hanger brackets 134 around the edge of circular apertures 190 and to the cross member by circular apertures 192.

The arrangements of FIGS. 9A and 9B ensure that the transverse positioning of the suspension components is also accurate relative to each other during assembly of the suspension assembly to the trailer portion 24 and at the same time enhances the lateral stability of the suspension assembly during cornering and the like when the trailer portion 24 is in use. Of course, numerous alternative bracing arrangements may also be employed, and the bracing may also be employed with the subassembly 248 of FIG. 8. While significant improvements to lateral stability can be achieved by the cross members between the hanger brackets, further improvements can be achieved by providing a further cross member between the air spring pedestals.

It will be appreciated that the subassembly 148 of the present invention enables a suspension to be fitted to a heavy vehicle trailer in a simpler, more accurate, and potentially more cost-effective manner than in prior art arrangements. Furthermore, the subassembly 148 enables the positioning of the suspension damper to be optimized to enhance damper performance.

Terms such as "fore," "aft," "upper," and "lower" as used herein are merely used for ease of description and should not be considered to be limiting.

It will be further appreciated that numerous changes may be made within the scope of the present invention. For example, the subassembly may be manufactured from multiple separate sub-components rather than a single stamping. The positioning, shape and dimensions of the hanger bracket, the damper mounting bracket and the air spring bracket may be adjusted, the longitudinal position of the damper mounting bracket may be varied according to particular requirements, and the bracket may be offset from the longitudinal axis of the subassembly. The air spring bracket may include a simple plate that is at the same level as the connection member with appropriate holes provided therein. Further mounting features, such as brackets or mounting apertures for ride height check valves and axle lift mechanisms, may also be incorporated in the subassembly. Where a trailer is to include tandem or tri-axles, the subassembly may be provided with two or three sets of hanger brackets, damper mounting brackets and air spring mounting brackets with the appropriate longitudinal spacing therebetween. The subassembly may be used to mount alternative types of trailing arms from that illustrated in FIG. 7, for example, spring steel type arms of the type shown in FIG. 2, fabricated arms or monocoque type suspensions. The subassembly may be made from suitable alternative materials such as aluminium.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A suspension subassembly for securement to a heavy vehicle trailer, the suspension subassembly comprising:
    a hanger bracket for attachment of a trailing arm;
    an air spring mounting bracket;
    a damper mounting bracket; and
    a connection member extending longitudinally between the hanger bracket and the air spring mounting bracket and connecting the hanger bracket and the air spring mounting bracket, wherein the damper mounting bracket is positioned intermediate the hanger bracket and the air spring mounting bracket, wherein the damper mounting bracket is substantially longitudinally aligned with the connection member.

2. The suspension subassembly according to claim 1 wherein the damper mounting bracket is secured to the connection member.

3. The suspension subassembly according to claim 1 wherein the damper mounting bracket is mounted rearward of a mid-point between the hanger bracket and air spring mounting bracket.

4. The suspension subassembly according to claim 3 wherein the damper mounting bracket is mounted forward of the air spring mounting bracket.

5. The suspension subassembly according to claim 1 wherein the damper mounting bracket includes first and second downwardly extending flanges for securement of a damper therebetween.

6. The suspension subassembly according to claim 1 wherein the hanger bracket is longitudinally aligned with the connection member.

7. The suspension subassembly according to claim 1 wherein the suspension subassembly is separate from further subassemblies to be secured to an opposed side of a heavy vehicle trailer.

8. The suspension subassembly according to claim 1 further including an air spring and a damper, wherein the trailing arm is a suspension trailing arm.

9. The suspension subassembly according to claim 8 wherein the suspension trailing arm is provided with a damper fixing bracket mounted behind an axle mounting location.

10. The suspension subassembly according to claim 8 wherein the suspension trailing arm is provided with a damper fixing bracket mounted in line with the suspension trailing arm.

11. A suspension subassembly for securement to a heavy vehicle trailer, the suspension subassembly comprising:
a hanger bracket for attachment of a trailing arm;
an air spring mounting bracket;
a damper mounting bracket; and
a connection member extending longitudinally between the hanger bracket and the air spring mounting bracket and connecting the hanger bracket and air spring mounting bracket, wherein the damper mounting bracket is positioned intermediate the hanger bracket and the air spring mounting bracket, and wherein the hanger bracket and the connection member are formed integrally from the same piece of material.

12. The suspension subassembly according to claim 11 wherein the damper mounting bracket and the connection member are formed integrally from the same piece of material.

13. The suspension subassembly according to claim 11 wherein the hanger bracket includes third and fourth downwardly extending flanges for securement of the trailing arm therebetween.

14. The suspension subassembly according to claim 11 wherein the air spring mounting bracket includes a substantially planar surface downwardly spaced from the connection member.

15. The suspension subassembly according to claim 11 wherein the air spring mounting bracket and the connection member are formed integrally from the same piece of material.

16. The suspension subassembly according to claim 11 wherein the connection member includes an aperture.

17. The suspension subassembly according to claim 11 wherein the connection member has a substantially planar upper surface.

18. The suspension subassembly according to claim 11 wherein the connection member includes a formation to assist in locating a heavy vehicle trailer on a chassis rail.

19. The suspension subassembly according to claim 11 further including a second suspension subassembly, wherein the suspension subassembly and the second suspension subassembly are secured together in a laterally spaced relationship.

20. The suspension subassembly according to claim 19 wherein a cross-member secures the suspension subassembly and the second suspension subassembly together.

21. The suspension subassembly according to claim 11 wherein the hanger bracket and the connection member are formed from a single piece of material.

22. The suspension subassembly according to claim 11 wherein the hanger bracket is integrally formed with the connection member.

23. A heavy vehicle trailer comprising:
a chassis rail; and
a suspension subassembly for securement to a heavy vehicle trailer, the subassembly including:
a hanger bracket for attachment of a trailing arm,
an air spring mounting bracket,
a damper mounting bracket, and
a connection member extending longitudinally between the hanger bracket and the air spring mounting bracket and connecting the hanger bracket and the air spring mounting bracket, wherein the damper mounting bracket is substantially longitudinally aligned with the connection member and is positioned intermediate the hanger bracket and the air spring mounting bracket, and wherein the chassis rail and the subassembly are one of permanently and semi-permanently secured to each other.

24. The heavy vehicle trailer according to claim 23 wherein the subassembly is welded to the chassis rail.

* * * * *